(12) United States Patent
Broderick et al.

(10) Patent No.: US 10,992,098 B2
(45) Date of Patent: Apr. 27, 2021

(54) METHOD AND APPARATUS FOR REAL TIME AVERAGING OF BEAM PARAMETER VARIATIONS

(71) Applicant: Epilog Corporation, Golden, CO (US)

(72) Inventors: Jeffery A Broderick, Golden, CO (US); Patrick B Kohl, Arvada, CO (US)

(73) Assignee: Epilog Corporation, Golden, CO (US)

( * ) Notice: Subject to any disclaimer, the term of this patent is extended or adjusted under 35 U.S.C. 154(b) by 34 days.

(21) Appl. No.: 16/703,642

(22) Filed: Dec. 4, 2019

(65) Prior Publication Data

US 2020/0185874 A1 Jun. 11, 2020

Related U.S. Application Data

(60) Provisional application No. 62/775,753, filed on Dec. 5, 2018.

(51) Int. Cl.
| | |
|---|---|
| *H01S 3/03* | (2006.01) |
| *H01S 3/139* | (2006.01) |
| *H01S 3/081* | (2006.01) |
| *H01S 3/105* | (2006.01) |
| *H01S 3/08* | (2006.01) |
| *H01S 3/038* | (2006.01) |
| *H01S 3/083* | (2006.01) |
| *H01S 3/0975* | (2006.01) |
| *H01S 3/07* | (2006.01) |

(52) U.S. Cl.
CPC ............ *H01S 3/139* (2013.01); *H01S 3/0315* (2013.01); *H01S 3/0818* (2013.01); *H01S 3/08086* (2013.01); *H01S 3/1053* (2013.01); *H01S 3/0385* (2013.01); *H01S 3/0388* (2013.01); *H01S 3/076* (2013.01); *H01S 3/0816* (2013.01); *H01S 3/0835* (2013.01); *H01S 3/0975* (2013.01)

(58) Field of Classification Search
CPC .. H01S 3/0315; H01S 3/08086; H01S 3/0816; H01S 3/0818; H01S 3/1053; H01S 3/139
See application file for complete search history.

(56) References Cited

U.S. PATENT DOCUMENTS

| | | | | |
|---|---|---|---|---|
| 4,688,228 | A * | 8/1987 | Newman | ............... H01S 3/0315 372/18 |
| 5,185,751 | A * | 2/1993 | Hale | ................... H01S 3/08036 372/18 |
| 5,317,576 | A * | 5/1994 | Leonberger | ............. H01S 3/067 372/102 |
| 6,984,803 | B1 | 1/2006 | Gamier | |
| 7,570,683 | B1 | 8/2009 | Broderick | |
| 7,843,976 | B2 * | 11/2010 | Cable | ...................... H01S 5/141 372/20 |

* cited by examiner

*Primary Examiner* — Kinam Park

(74) *Attorney, Agent, or Firm* — Adsero IP

(57) ABSTRACT

A waveguide gas laser having a laser resonator cavity of a variable length is subjected to cyclical varying of the length of the cavity during generation of a laser beam a length variation amount sufficient to force a laser beam generated in the resonator cavity though a substantially complete optical longitudinal cavity mode at a rate operable to smooth at least one laser beam parameter variation. In this manner variation in the laser beam parameter is averaged by moving through at least a portion of an optical longitudinal cavity mode.

30 Claims, 11 Drawing Sheets

METHOD AND APPARATUS FOR REAL TIME AVERAGING OF BEAM PARAMETER VARIATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention is directed to waveguide gas lasers and more particularly, to a method and apparatus for real-time averaging of beam parameter variations.

BACKGROUND

As a waveguide resonator heats up during operation, it expands which increases the length of the resonator cavity, causing it to move through various longitudinal cavity optical modes. These different optical modes have variations in power, wavelength, and other physical beam parameters which cause variations in spot size intensities when the beam is focused. Where the laser is, for example, used in generating a beam used in laser engraving and marking machine, these laser beam parameter variations manifest themselves in variations in the effective mark created on a work piece during engraving. For example, if a solid fill were to be engraved on a work piece, variations in the intensity of the focal spot might show up as light and dark "bands" on the solid fill portion of the workpiece as the laser expands thermally and moves through the various longitudinal cavity modes.

There are at least three known ways to eliminate or reduce banding:

1) Length-stabilize the laser cavity. This is an old, established technology. Some laser beam parameters can be stabilized by mounting one of the cavity mirrors on a piezoelectric crystal, allowing for small adjustments of the effective cavity length. A portion of the output beam is directed into a power meter (or other such measuring device), and as the power (or other such beam metric) drifts over time, the piezo is used to change the cavity length and hold the power steady. This kind of cavity stabilization typically results in an output beam that is constant in power and spectral content, with generally uniform laser beam parameters. However, the stabilization technology is expensive and complex, requiring a closed-loop feedback system with detectors, logic, and drivers of various sorts. Adding such a system to a commercial waveguide gas laser would make it cost prohibitive.

2) Make a laser resonator cavity with total length on the order of five or more meters. The spacing between longitudinal modes is inversely proportional to the cavity length. With a long enough resonator cavity, the spacing between modes becomes small compared to the width of common waveguide gas laser lines, such as the P20 line. In that situation, a hop from one longitudinal mode to another will not change which laser line is operating, or significantly change the overall gain of the laser. As a result, the laser's output beam parameters may be steady enough that banding does not occur. Most current waveguide gas laser cavities are on the order of one meter long. Extending the cavity to the necessary length would be prohibitively cumbersome and expensive.

3) It is generally known that a skilled aligner can significantly reduce banding. Without intending to be bound by theory, skilled alignment may suppress higher-order spatial modes that might otherwise lead to variations in output laser beam parameters in time. Fixing banding by way of alignment is more of an art than a science—one cannot provide reliable step-by-step instructions that will definitely make a laser band less. It also tends to be iterative and time consuming—an aligner makes adjustments, runs a test job, makes more adjustments, and so on. Again, this adds excessively to the cost a commercial waveguide laser.

The present disclosure is intended to overcome one or more of the problems discussed above. This is accomplished not by trying to make a laser resonator cavity that doesn't produce variations in output laser beam parameters which result in banding, but by allowing the laser to freely yield varying laser beam parameters and then averaging the laser beam parameters by physically changing the length of the laser cavity at a rate that causes the light and dark bands blur together into an apparently-uniform output as demonstrated in the Examples provided herein.

SUMMARY OF THE EMBODIMENTS

An improved waveguide gas laser is provided by cyclically varying the length of the laser resonator cavity during generation of a laser beam. In this manner variations in the laser beam parameters are averaged by moving through at least a portion of an optical longitudinal cavity mode. As used herein "laser beam parameters" include, but are not limited to, power, beam quality, wavelength, beam size or beam divergence. Cyclically varying the length of the laser resonator cavity as described herein smoothes out variations in the laser beam parameters which results in a beam that has more uniform or stable laser beam parameters. Where the laser resonator includes one or more mirrors for redirecting a generated beam, cyclically varying the length of the resonator cavity can be achieved by using an actuator such as piezo-electric drive operatively associated with at least one of the cavity mirrors to cyclically longitudinally move the cavity mirror a length variation that effectively "scans" through the various longitudinal cavity modes at a rate producing at least one more uniform laser beam parameter.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
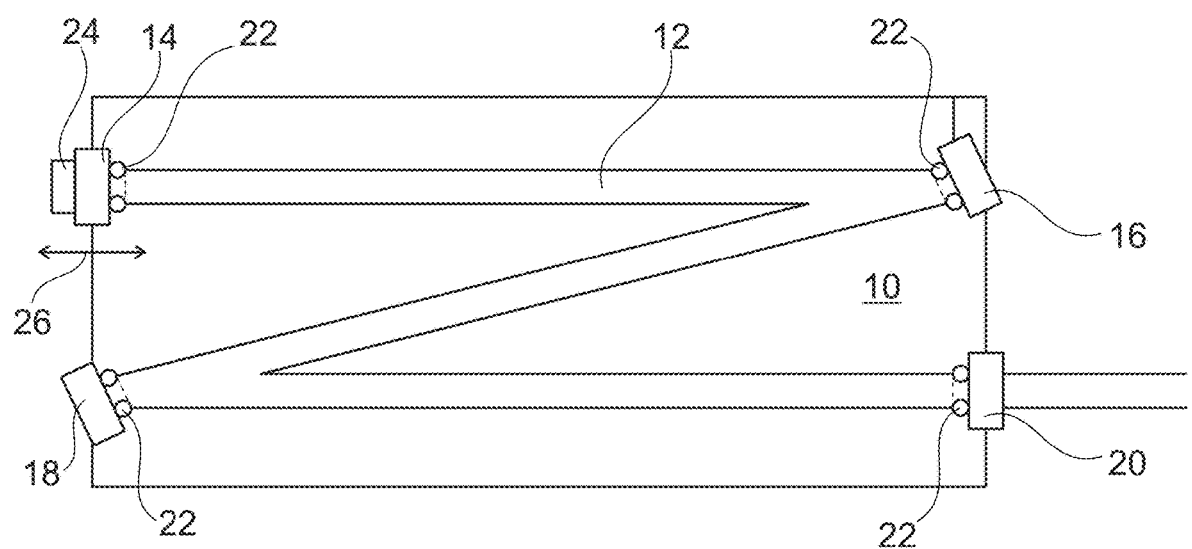
FIG. 1 is a schematic representation of a waveguide gas laser resonator having a "Z" fold cavity in a sectional plan view.

FIG. 1 is a schematic representation of a waveguide laser resonator 10 in a sectional plan view. In this particular embodiment, the resonator has a resonator cavity 12 in a Z-fold configuration. Other embodiments could include other folded or unfolded resonator cavity configurations. The embodiment of FIG. 1 includes four reflector mirrors, including a high reflector mirror 14, a first angled reflector mirror 16, a second angled reflector mirror 18 and a dielectric reflector mirror or output coupler 20. Each of the reflector mirrors is sealingly engaged to the resonator cavity by an elastomeric O-ring 22. A driver 24 is operatively associated with the high reflector mirror 14. In this embodiment, the operative association is attachment to a rear surface of the high reflector mirror 14. The driver is configured to provide a cyclical longitudinal movement of the high reflector mirror 14 sufficient to cyclically vary the effective length of the resonator cavity as illustrated by the arrow 26 at a frequency or rate. The movement is facilitated by compressing and decompressing the elastomeric O-ring 22. In various embodiments the rate can be constant, variable or randomly varied.

Embodiments can include providing a length variation of more than about ½ of a wavelength (approximately 5 microns). While not intending to limit all embodiments to more than ½ of a wavelength, less length variation might not force the laser through a substantially complete optical longitudinal cavity mode and thus not provide sufficient stabilization of the output beam parameters to adequately reduce banding for aesthetic purposes when, for example, the laser is used in laser engraving and marking machine for engraving a work piece by scanning a laser output beam on the work piece. As used herein, a "substantially complete optical longitudinal cavity mode" means a distance to provide sufficient stabilization of the output beam parameters to reduce banding for aesthetic purposes when, for example, the laser is used in laser engraving and marking machine for engraving a work piece by scanning a laser output beam on the work piece. In a first embodiment the rate should be at least 10 Hz, and rates within ranges of 40-100 Hz, and more particularly 60-80 Hz are effective in averaging or smoothing laser parameters sufficiently to stabilize laser beam output and reduce visually perceptible banding. In a second embodiment a low rate of variation in the range of less than 10 Hz and more particularly about 1, 5 and 10 Hz have been found to be effective in averaging or smoothing laser parameters sufficiently to stabilize laser beam output and reduce visually perceptible banding. Without being bound by theory, the first embodiment may be effective because bright and dark sections resulting from parameter variations can change horizontally across a single line of beam output and visual perception of the changes or banding is reduced to the point of being difficult to detect visually by a human eye. The second embodiment with the low rate of variation may be effective because successive lines of the engraving are alternately bright and dark, and the lines are small enough that the eye averages them out so that visual perception of the changes or banding is reduced to the point of being difficult to detect visually by a human eye. In other words, in high-frequency operation of the first embodiment, the bright and dark sections are effectively averaged horizontally across a single line. In low-frequency operation of the second embodiment, the bright and dark sections are effectively averaged vertically across multiple lines.

Figure 2A:
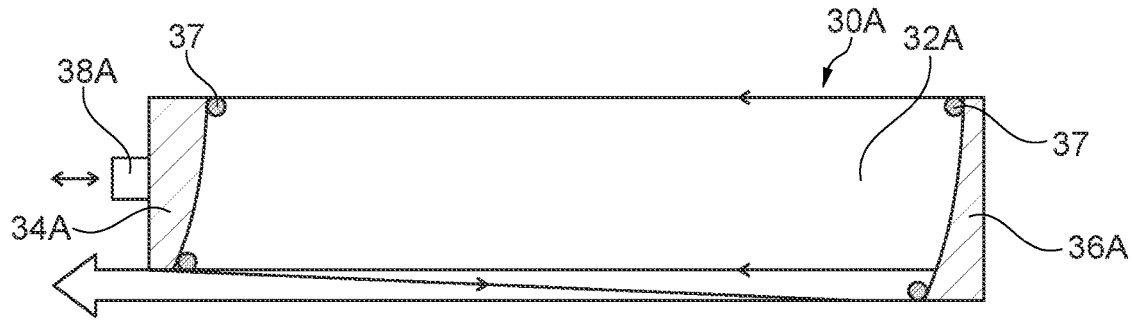
FIG. 2A is a schematic representation of a positive branch waveguide gas laser unstable resonator having one driver in a sectional plan view.
Figure 2B:
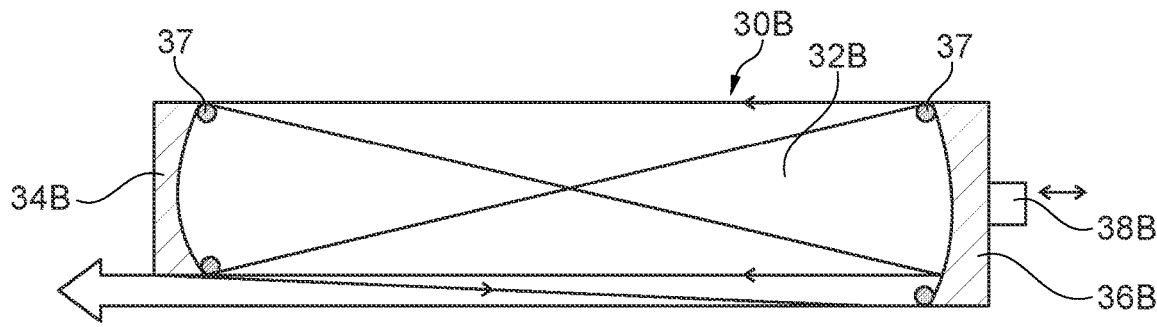
FIG. 2B is a schematic representation of a negative branch waveguide gas laser unstable resonator having one driver in a sectional plan view.

FIG. 2A is a schematic representation of a positive branch waveguide gas laser unstable resonator 30A in a sectional plan view. FIG. 2B is a schematic representation of a negative branch waveguide gas laser unstable resonator 30B in a sectional plan view. In each of these embodiments a resonator cavity (32A and 32B) is defined between first and second reflector mirror (34A, 34B and 36A, 36B). In all embodiments each of the reflector mirrors is sealingly engaged to the resonator cavity by an elastomeric O-ring 37. In FIG. 2A a single driver 38A is operatively associated with the first reflective mirror 34A. In FIG. 2B a single driver 38B is operatively associated with the second mirror 36B.

Figure 3A:
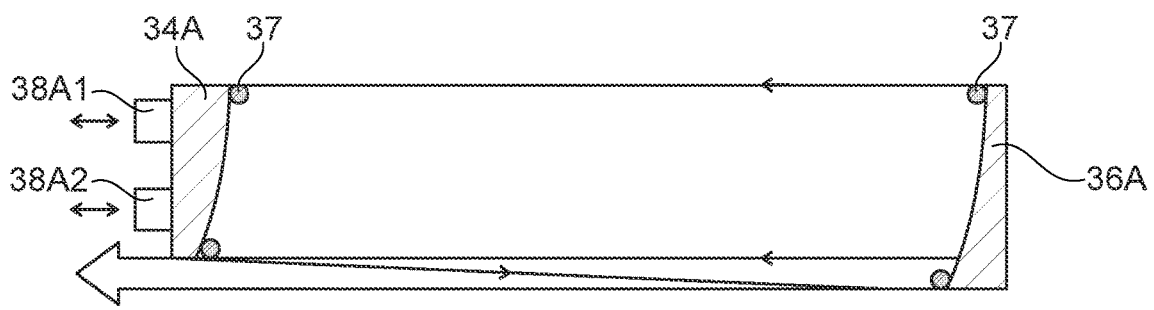
FIG. 3A is a schematic representation of a positive branch waveguide gas laser unstable resonator having two drivers in a sectional plan view.
Figure 3B:
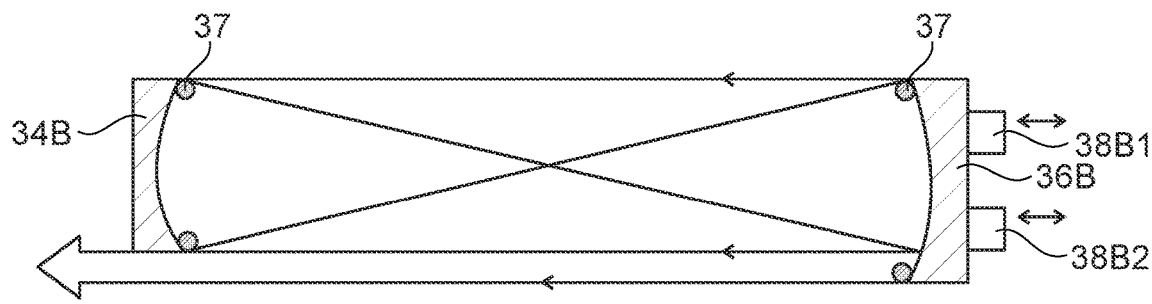
FIG. 3B is a schematic representation of a negative branch waveguide gas laser unstable resonator having two drivers in a sectional plan view.

FIGS. 3A and 3B are identical to FIGS. 2A and 2B respectively, differing only in two drivers 38A1, 38A2 and 38B1, 38B2 are shown operatively associated with the first mirror 34A and the second mirror 36B respectively.

The embodiments of FIGS. 2A, 2B, 3A and 3B are representative of various different waveguide gas laser resonators where various embodiments of the current disclosure could be utilized to smooth variations in laser beam parameters. These embodiments illustrate that more than one driver may be used when, for example, a mirror is too heavy to be adequately moved longitudinally enough or at a rate operable to smooth variations in laser beam parameters by a single driver. Where more than one driver is used as in FIGS. 3A and 3B, embodiments can include the drivers being operated in sync at the same frequency or out of sync at different frequencies. While only two drivers are shown in FIGS. 3A and 3B, more than two drivers are within the scope of the disclosure.

In some embodiments disclosed herein the driver is a piezoelectric assembly that can be driven at various frequencies and through various displacement lengths. For example, in one embodiment the driver is a Thorlabs PK25LA2P2 piezoelectric stack. In such an embodiment the piezoelectric crystal is driven by a Thorlabs MDT693A controller (not shown), externally triggered by a standard function generator (not shown).

In other embodiments other types of drivers may be used, for example various mechanical or electromechanical drivers configured to provide a desired or select length variation at a desired or select rate.

U.S. Pat. No. 7,570,683, which is expressly incorporated in its entirety herein, provides one example of a waveguide gas laser assembly with which the embodiments described herein could be deployed. U.S. Pat. No. 6,984,803, which is expressly incorporated in its entirety herein, is one of many examples of a laser engraving and marking machine which could beneficially employ a gas waveguide laser ("laser beam source") including the features described herein.

EXAMPLES

The following examples are provided for illustrative purposes only and are not intended to limit the scope of the disclosure.

Testing was conducted using an Epilog Model D laser (TD006869) that exhibited banding. It was equipped with a piezoelectric assembly and driver described above.

Initially the piezo-equipped Model D was coupled to a characterization station and full sets of data were collected with the piezo turned off. Thereafter the piezo was actuated and data sets were taken with a sinusoidal driving voltage at 40, 60, 80, 100, and 120 Hz. The driving voltage was reduced at higher frequencies to prevent distortion in the driving signal, but in every case the peak-to-peak voltage was at least 90V. According to the specification sheet for the piezoelectric stack, that voltage should provide at least 8 microns of displacement (which is greater than ½ of a wavelength)—assuming the piezo has enough time to fully expand and contract. As reflected in the discussion that follows, that assumption probably fails at higher frequencies.

The following frequencies produced the following results on work pieces engraved by a laser engraving and marking machine using a gas waveguide laser adapted as described above. It should be noted that the attached images of work pieces samples subjected to the laser output may not reflect what can be perceived by a naked eye examining actual work piece samples and thus the written description may be more enlightening than the images themselves:

Driver Off

Figure 4:
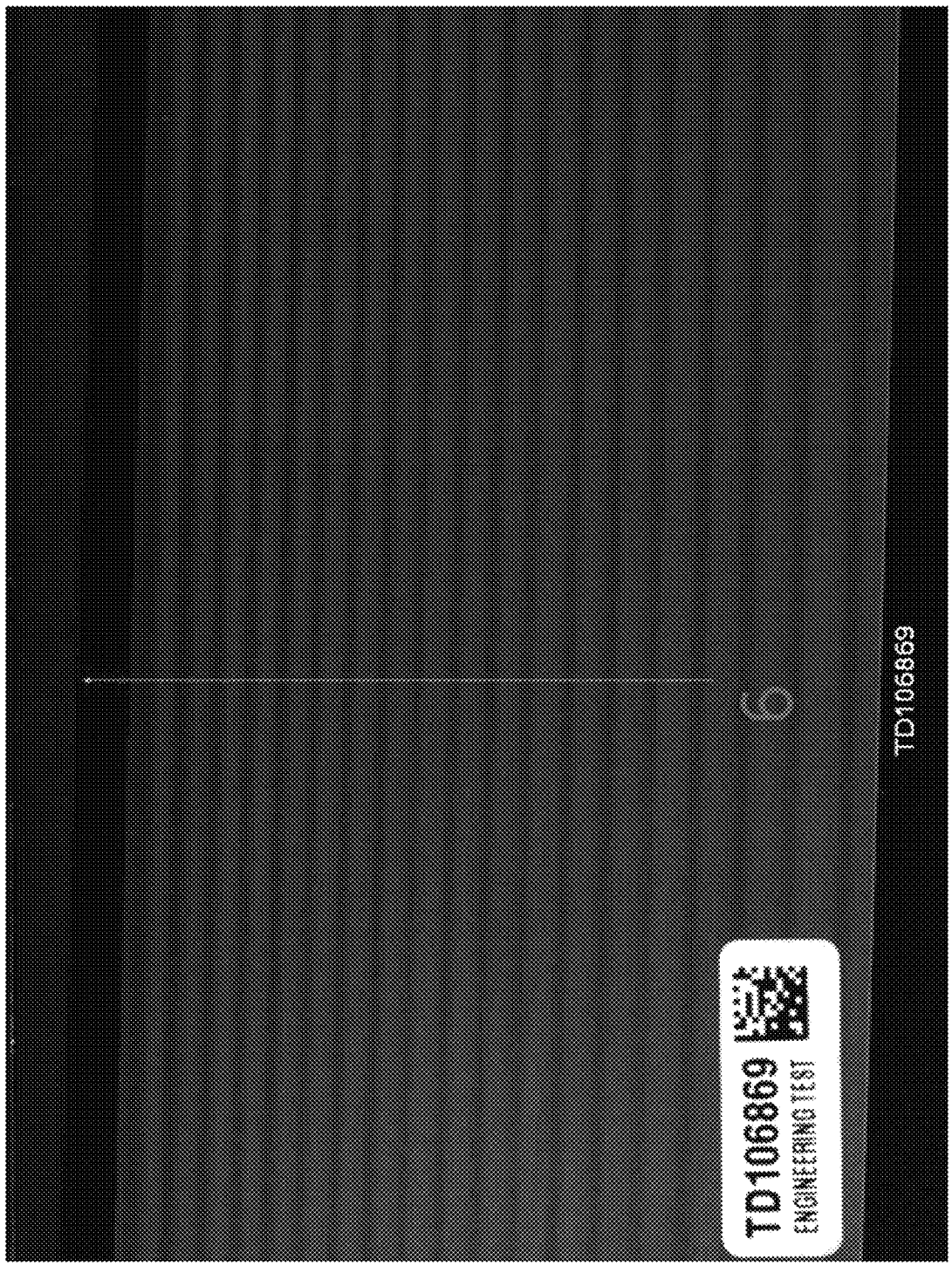
FIG. 4 is an image of work pieces engraved by a laser engraving and marking machine using a gas waveguide laser adapted as described herein with a single driver turned off.

Referring to FIG. 4, the bands are deep and clearly visible with the piezo drive off.

Driver on—40 Hz

Figure 5:
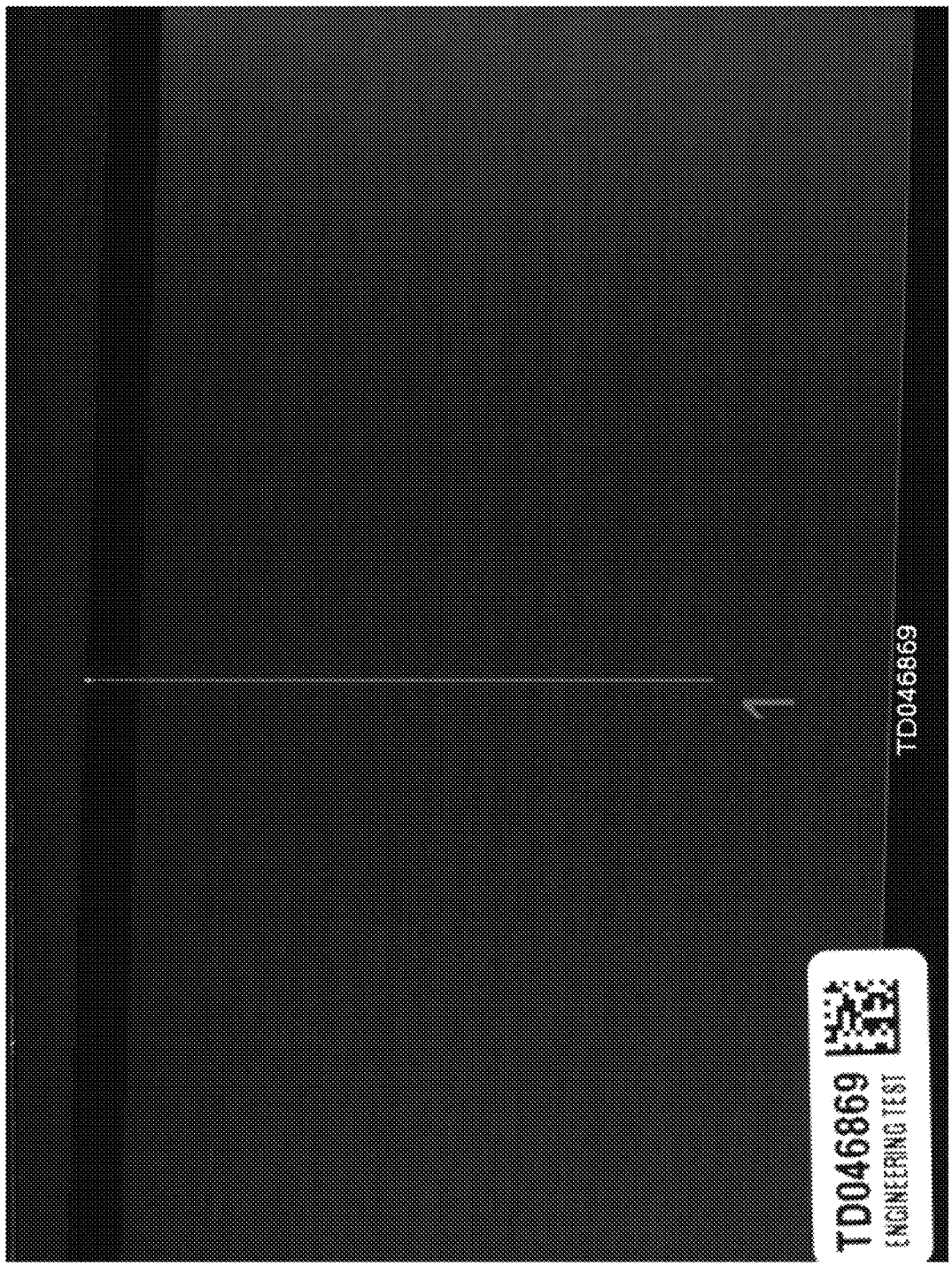
FIG. 5 is an image of work pieces engraved by a laser engraving and marking machine using a gas waveguide laser adapted as described herein with a single driver operating at 40 Hz.

Referring to FIG. 5, At 40 Hz the bands are significantly reduced, but still visible. Observing an actual sample the naked eye can detect some mild horizontal variation, suggesting that 40 Hz is not fast enough to blur out the banding. This is to be expected, given that the drive head of the laser engraving and marking machine is scanning at approximately 80 inches per second.

Driver on—60 Hz

Figure 6:
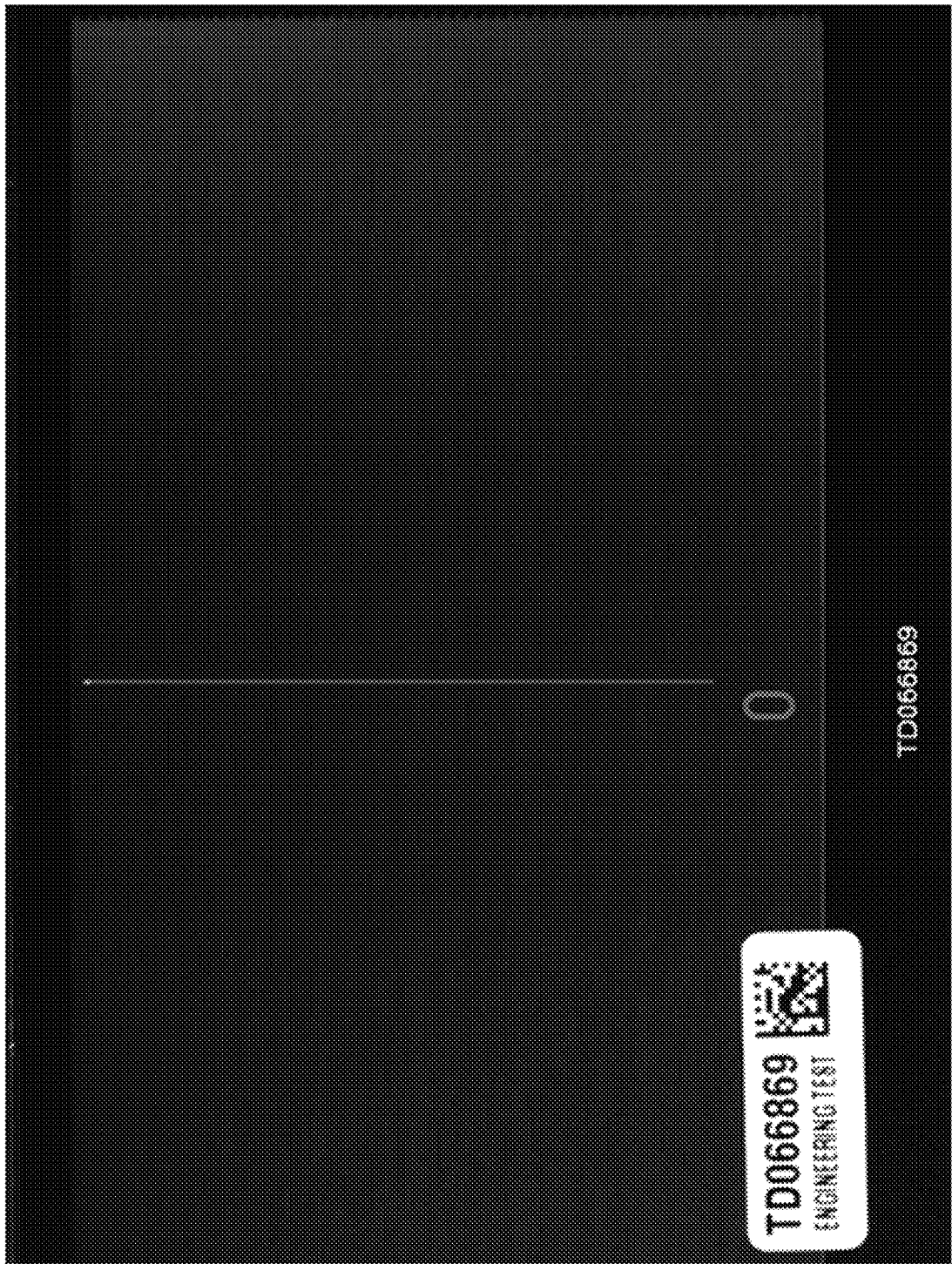
FIG. 6 is an image of work pieces engraved by a laser engraving and marking machine using a gas waveguide laser adapted as described herein with a single driver operating at 60 Hz.

Referring to FIG. 6, at 60 Hz the bands are further reduced, as is the horizontal variation, in actual samples viewed with the naked eye, though the latter is not perceptible in this picture.

Driver on—80 Hz

Figure 7:
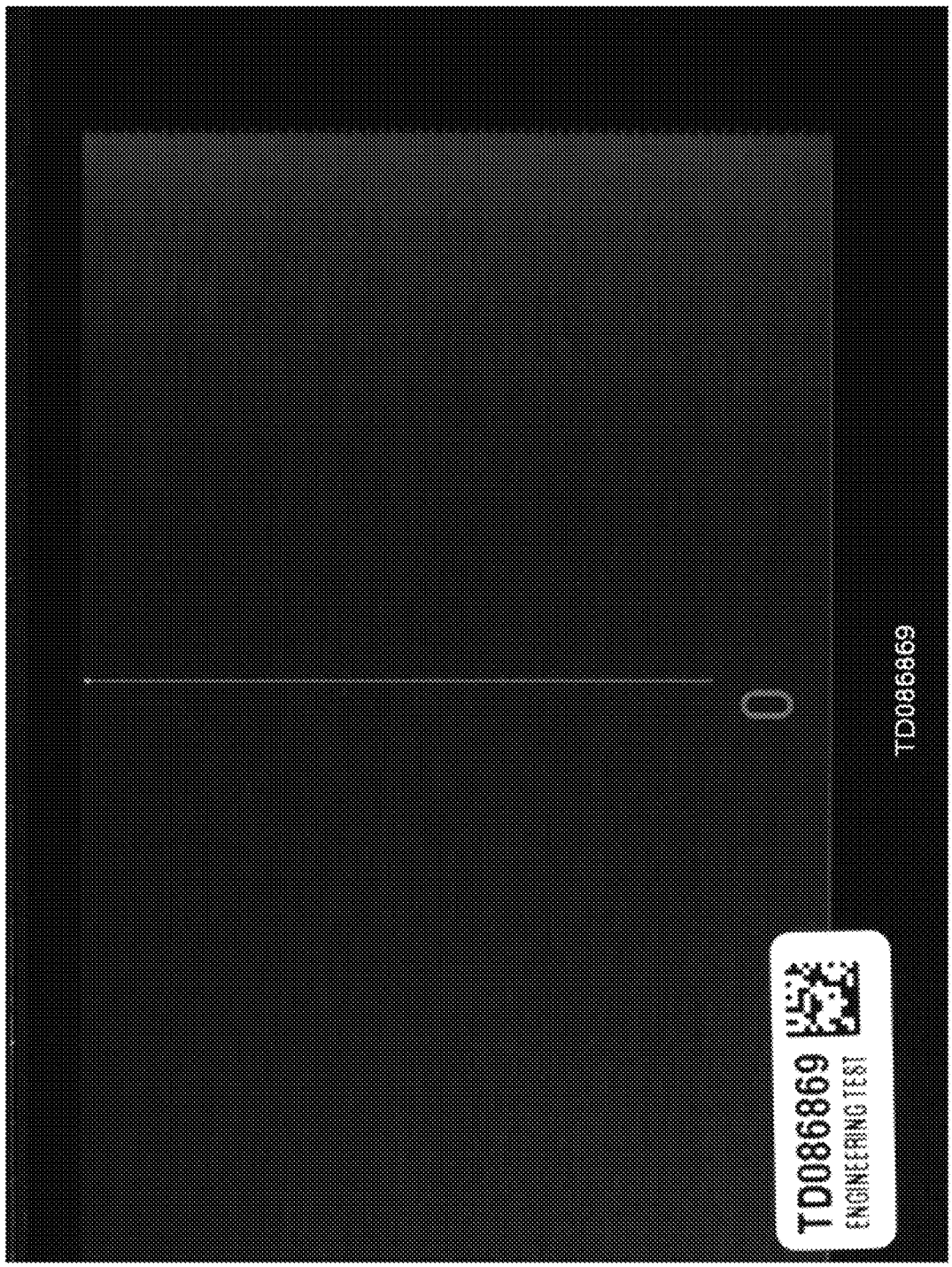
FIG. 7 is an image of work pieces engraved by a laser engraving and marking machine using a gas waveguide laser adapted as described herein with a single driver operating at 80 Hz.

Referring to FIG. 7, at 80 Hz the results are greatly improved. In actual samples viewed with the naked eye, the bands and the horizontal variations are almost completely gone.

Driver on—100 Hz

Figure 8:
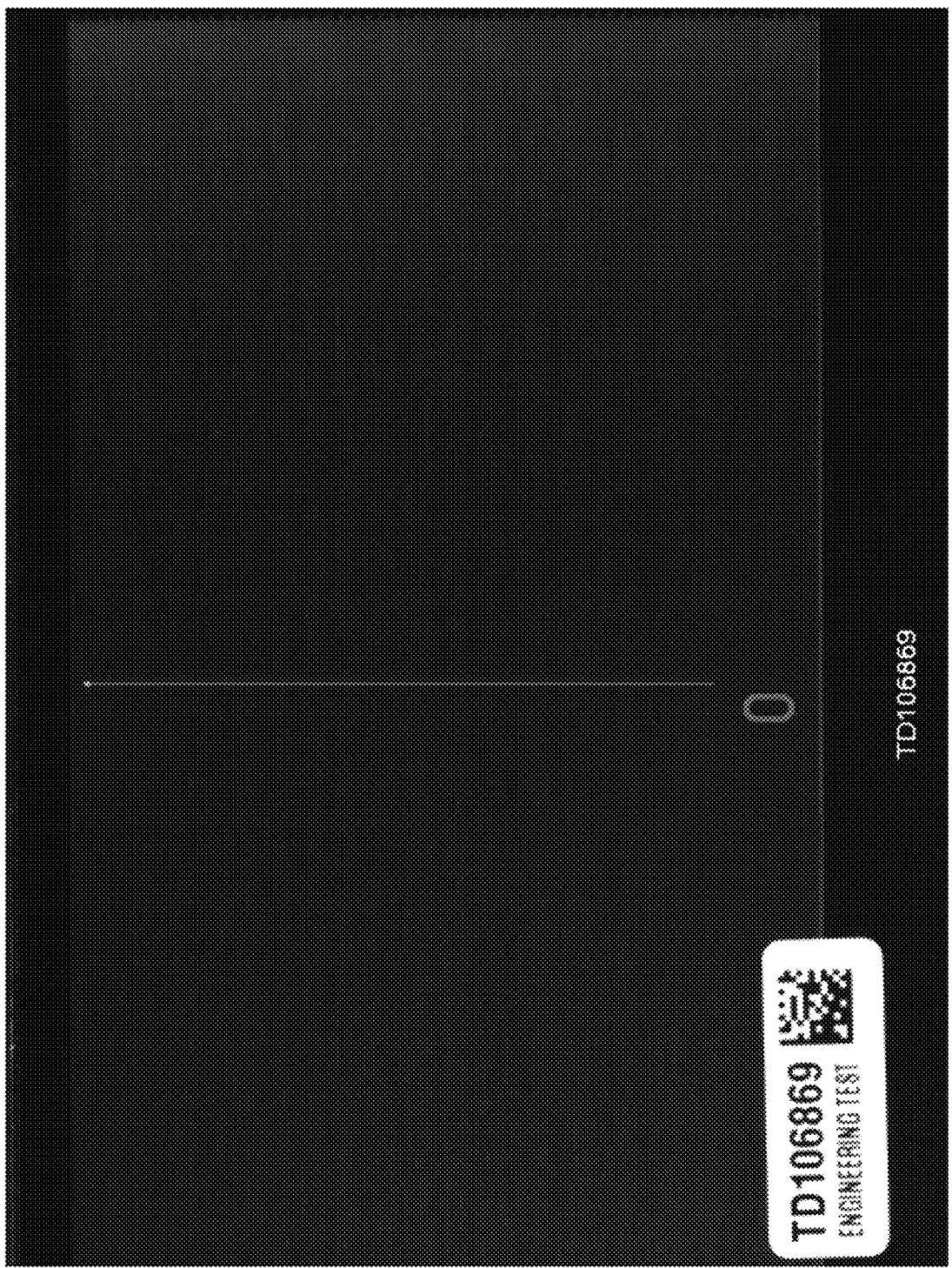
FIG. 8 is an image of work pieces engraved by a laser engraving and marking machine using a gas waveguide laser adapted as described herein with a single driver operating at 100 Hz.

Referring to FIG. 8, at 100 Hz the bands begin to reappear in actual samples viewed with the naked eye. This is predicable because the specs for the piezo driver claim that the capacitive load of the piezo is enough to keep it from reaching full displacement at frequencies in this range.

Driver on—120 Hz

Figure 9:
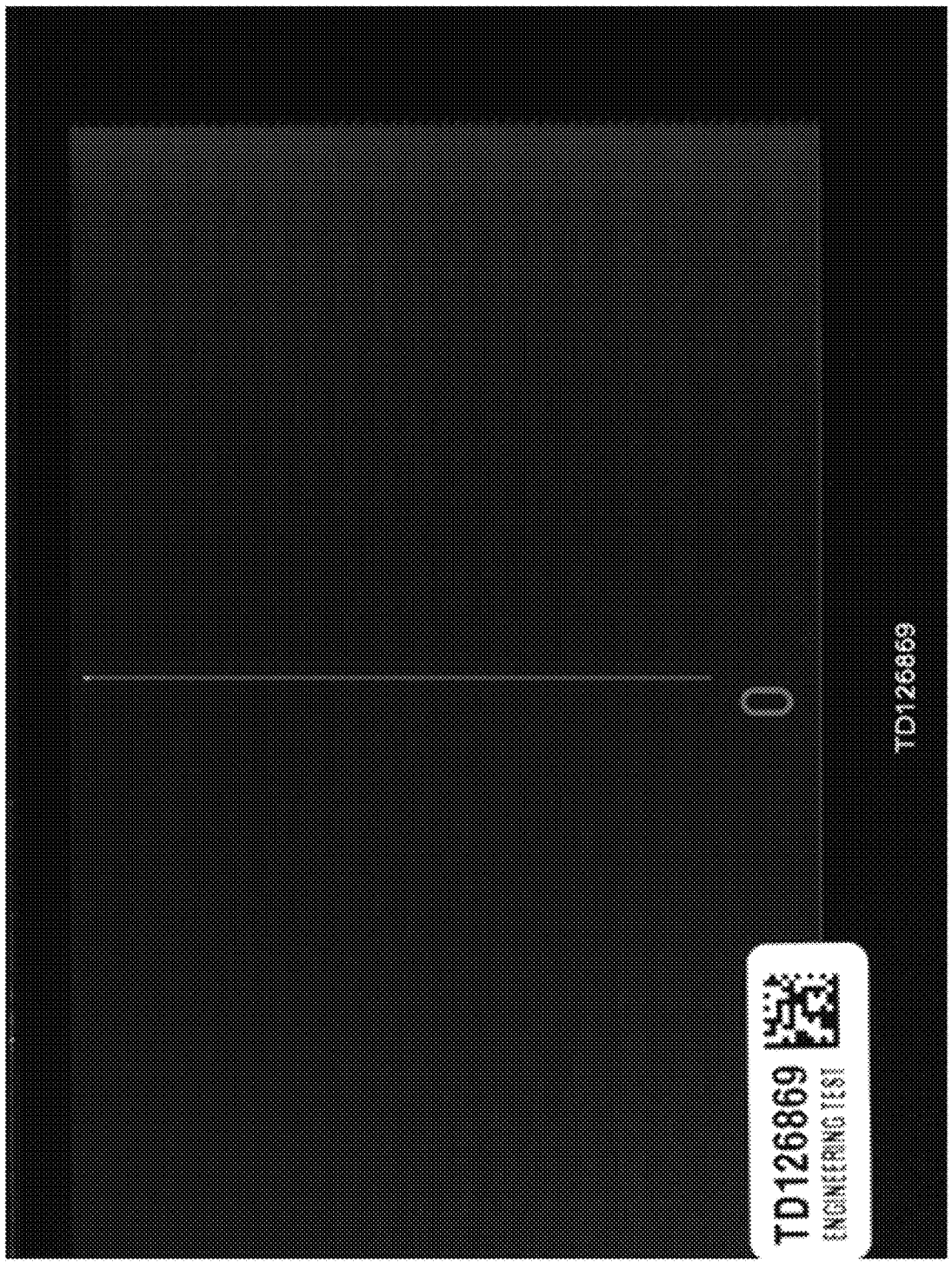
FIG. 9 is an image of work pieces engraved by a laser engraving and marking machine using a gas waveguide laser adapted as described herein with a single driver operating at 120 Hz.

Referring to FIG. 9, at 120 Hz, the bands continue to deepen in actual work piece samples viewed with the naked eye. It is likely that at this point the electrical and/or mechanical response time of the piezo is much too long for it to displace significantly, despite the relatively large voltages being applied.

Driver on—1 Hz

Figure 10:
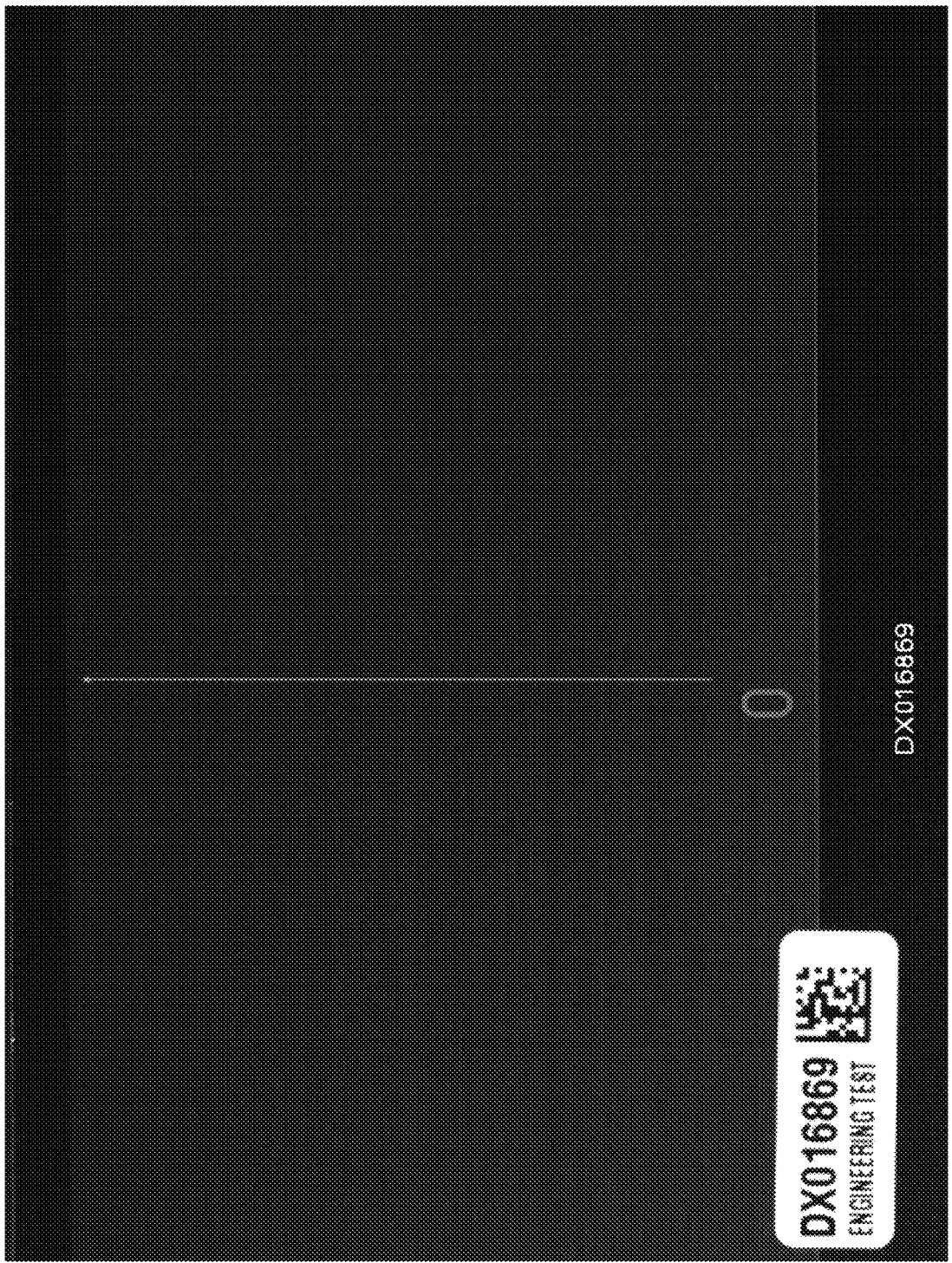
FIG. 10 is an image of work pieces engraved by a laser engraving and marking machine using a gas waveguide laser adapted as described herein with a single driver operating at 1 Hz.

Referring to FIG. 10, at 1 Hz, the bands are significantly diminished at compared to FIG. 4 showing the driver off.

Driver on—5 Hz

Figure 11:
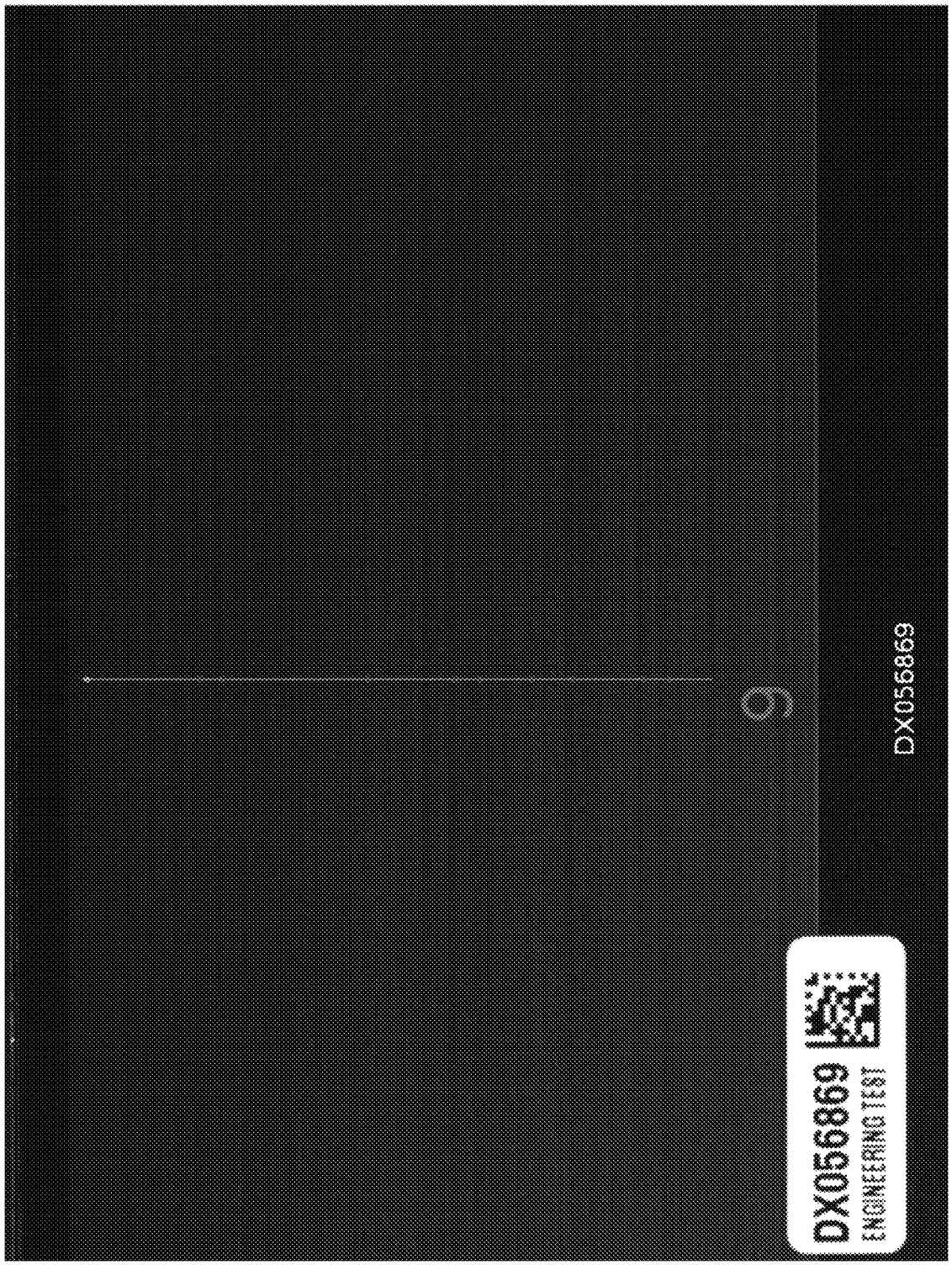
FIG. 11 is an image of work pieces engraved by a laser engraving and marking machine using a gas waveguide laser adapted as described herein with a single driver operating at 5 Hz.

Referring to FIG. 11, at 5 Hz the bands are diminished as compared to FIG. 4 with the driver off but are not as diminished as when the driver is at 1 Hz.

Driver on—10 Hz

Figure 12:
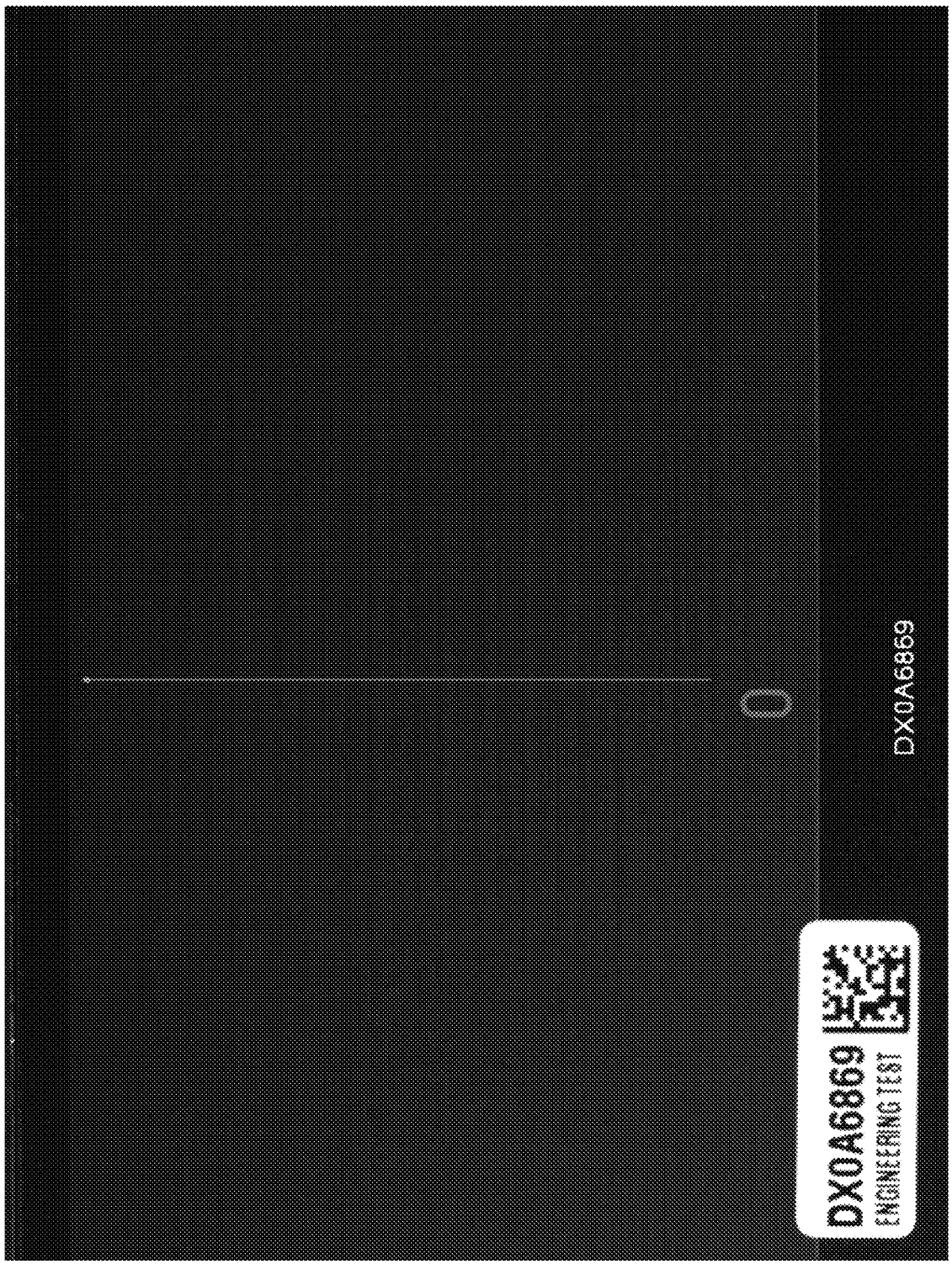
FIG. 12 is an image of work pieces engraved by a laser engraving and marking machine using a gas waveguide laser adapted as described herein with a single driver operating at 10 Hz

Referring to FIG. 12, at 10 Hz the bands are diminished as compared to FIG. 4 with the driver off but are not as diminished as when the driver is at 1 Hz.

The description of the various embodiments has been presented for purposes of illustration and description but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. A method of averaging laser beam parameter variations in a gas waveguide laser comprising:
   providing a gas waveguide laser resonator cavity of variable length having a gas sealed therein;
   generating a laser beam within the laser resonator cavity; and
   cyclically varying a length of the laser cavity a length variation amount sufficient to force a laser beam generated in the resonator cavity though a substantially complete optical longitudinal cavity mode at a rate operable to smooth at least one laser beam parameter variation.

2. The method of claim 1 wherein rate is operable to stabilize a laser beam output of the laser enough to reduce visually perceptible banding on a work piece scanned by the laser beam output.

3. The method of claim 1 wherein the rate is constant.

4. The method of claim 1 wherein the rate is varied.

5. The method of claim 4 wherein the variable rate is randomly varied.

6. The method of claim 1 wherein the length variation is more than about ½ a wavelength.

7. The method of claim 6 where the rate is more than 10 Hz.

8. The method of claim 6 wherein the rate is between about 40-100 Hz.

9. The method of claim 6 wherein the rate is between about 60-80 Hz.

10. The method of claim 6 wherein the rate is less than 10 Hz.

11. The method of claim 6 wherein the rate is about 1 Hz.

12. The method of claim 1 wherein the cyclically varying a length of the laser cavity a length variation amount step comprises providing at least one piezoelectric driver operatively associated with a reflector mirror optically coupled to the resonator cavity, the at least one piezoelectric driver being constructed and arranged to longitudinally move the reflector mirror the length variation amount at the rate.

13. The method of claim 1 wherein the cyclically varying a length of the laser cavity a length variation amount step comprises providing at least one mechanical or electromechanical driver operatively associated with a reflector mirror optically coupled to the resonator cavity, the at least one mechanical or electromechanical driver being constructed and arranged to longitudinally move the reflector mirror the length variation amount at the rate.

14. The method of claim 12 wherein the cyclically varying step a length of the laser cavity a length variation amount further comprises providing an elastomeric O-ring sealing the reflector mirror with the cavity, wherein compressing and decompressing the elastomeric O-ring provides the length variation.

15. The method of claim 13 wherein the cyclically varying a length of the laser cavity a length variation amount step further comprises providing an elastomeric O-ring sealing the reflector mirror with the cavity, wherein compressing and decompressing the elastomeric O-ring provides the length variation.

16. The method of claim 1 wherein the at least one laser beam parameter is at least one of power, beam quality, wavelength, beam size or beam divergence.

17. A waveguide gas laser comprising:
   a resonator cavity;
   a reflector mirror optically coupled to the resonator cavity; and
   length varying means for longitudinally cyclically varying a length of the resonator cavity operatively associated with the reflector mirror, wherein the length varying means is configured to vary the length of the resonator cavity a length variation amount sufficient to force a laser beam generated in the resonator cavity though a substantially complete longitudinal mode at a rate operative to smooth at least one laser beam parameter variation.

18. The waveguide laser of claim 17 wherein rate is operable to stabilize a laser beam output of the laser enough to reduce visually perceptible banding on a work piece scanned by the laser beam output.

19. The waveguide laser of claim 17 wherein the rate is varied.

20. The waveguide gas laser of claim 17 wherein the length varying means provides a length variation of more than ½ a wavelength.

21. The waveguide gas laser of claim 20 where the length varying means provides a rate that is more than 10 Hz.

22. The waveguide gas laser of claim 20 wherein the length varying means provides a rate less than 10 Hz.

23. The waveguide gas laser of claim 17 wherein the resonator cavity comprises a Z-fold cavity configuration comprising a plurality of reflector mirrors optically coupled to the resonator cavity and the length varying means is operatively associated with one of the plurality of reflector mirrors.

24. A waveguide gas laser comprising:
   a resonator cavity;
   at least one reflective mirror optically coupled to the resonator cavity;
   an elastomeric O-ring providing a gas tight seal between the at least one reflective mirror and the resonator cavity;
   at least one driver operatively associated with the at least one reflective mirror, the at least one driver being configured to cyclically compress and decompress the elastomeric O-ring to vary a length of the resonator cavity by a length variation amount sufficient to force a laser beam generated in the resonator cavity though a substantially complete longitudinal mode at a rate operative to smooth at least one laser beam parameter variation.

25. The waveguide laser of claim 24 wherein rate is operative to stabilize a laser beam output of the laser enough to reduce visually perceptible banding on a work piece scanned by the laser beam output.

26. The waveguide gas laser of claim 24 wherein the at least one driver provides a length variation of more than ½ a wavelength.

27. The waveguide gas laser of claim 26 where the at least one driver provides a rate that is more than 10 Hz.

28. The waveguide gas laser of claim 26 wherein the at least one driver provides a rate that is less than 10 Hz.

29. The waveguide gas laser of claim 26 wherein the at least one driver provides a rate that is constant.

30. The waveguide gas laser of claim 24 wherein the resonator cavity comprises a Z-fold cavity configuration and the at least one reflective mirror comprises a plurality of reflector mirrors and the driver is operatively associated with one of the plurality of reflector mirrors.

* * * * *